United States Patent
Living

(10) Patent No.: US 8,068,682 B2
(45) Date of Patent: Nov. 29, 2011

(54) GENERATING OUTPUT PIXELS OF AN OUTPUT IMAGE FROM ONE OR MORE INPUT IMAGES USING A SET OF MOTION VECTORS HAVING A SUB-PIXEL ACCURACY

(75) Inventor: Jonathan Living, Nr. Stourbridge (GB)

(73) Assignee: Sony United Kingdom Limited, Weybridge (GB)

( * ) Notice: Subject to any disclaimer, the term of this patent is extended or adjusted under 35 U.S.C. 154(b) by 1097 days.

(21) Appl. No.: 11/909,810

(22) PCT Filed: Oct. 27, 2006

(86) PCT No.: PCT/GB2006/004022
§ 371 (c)(1),
(2), (4) Date: Sep. 27, 2007

(87) PCT Pub. No.: WO2007/051990
PCT Pub. Date: May 10, 2007

(65) Prior Publication Data
US 2008/0158417 A1     Jul. 3, 2008

(30) Foreign Application Priority Data
Oct. 31, 2005   (GB) .................................. 0522196.5

(51) Int. Cl.
*G06K 9/46* (2006.01)
(52) U.S. Cl. ........ 382/236; 382/103; 382/107; 382/232; 348/441; 348/448; 348/452; 348/699; 348/700; 375/240.12; 375/240.16; 375/240.17; 375/240.24; 375/240
(58) Field of Classification Search .................. None
See application file for complete search history.

(56) References Cited

U.S. PATENT DOCUMENTS
5,600,377 A * 2/1997 David et al. ................... 348/452
(Continued)

FOREIGN PATENT DOCUMENTS
GB   2 280 811    2/1995
GB   2 313 515    11/1997

OTHER PUBLICATIONS

Vandendorpe et al. "Motion-compensated conversion from interlaced to progressive formats" date is unknown, estimated date is Jun. 1994, as an equivalent document was published in Jun. 1994, by the same authors under the same title, in Signal Processing: Image Communication, vol. 6, Issue 3, pp. 193-211.* U.S. Appl. No. 11/909,726, filed Sep. 26, 2007, Living.
U.S. Appl. No. 11/911,351, filed Oct. 12, 2007, Living.

*Primary Examiner* — Sath V Perungavoor
*Assistant Examiner* — Jason Heidemann
(74) *Attorney, Agent, or Firm* — Oblon, Spivak, McClelland, Maier & Neustadt, L.L.P.

(57) ABSTRACT

An image processing apparatus in which output pixels of an output image are generated from one or more input images using motion vectors having a sub-pixel accuracy. A motion vector allocator allocates motion vectors in the pixels, and compares a current output pixel with test image areas pointed to by motion vectors in the pixels to detect a most suitable motion vector for the current output pixel. A pixel generator operates in a first mode if the output pixel is within a threshold displacement from an image region having substantially different motion characteristics to those of that output pixel, and in a second mode otherwise. The pixel generator includes a spatial filter generating an output pixel value at a required pixel position to a sub-pixel accuracy.

7 Claims, 14 Drawing Sheets

U.S. PATENT DOCUMENTS

Figure 1:
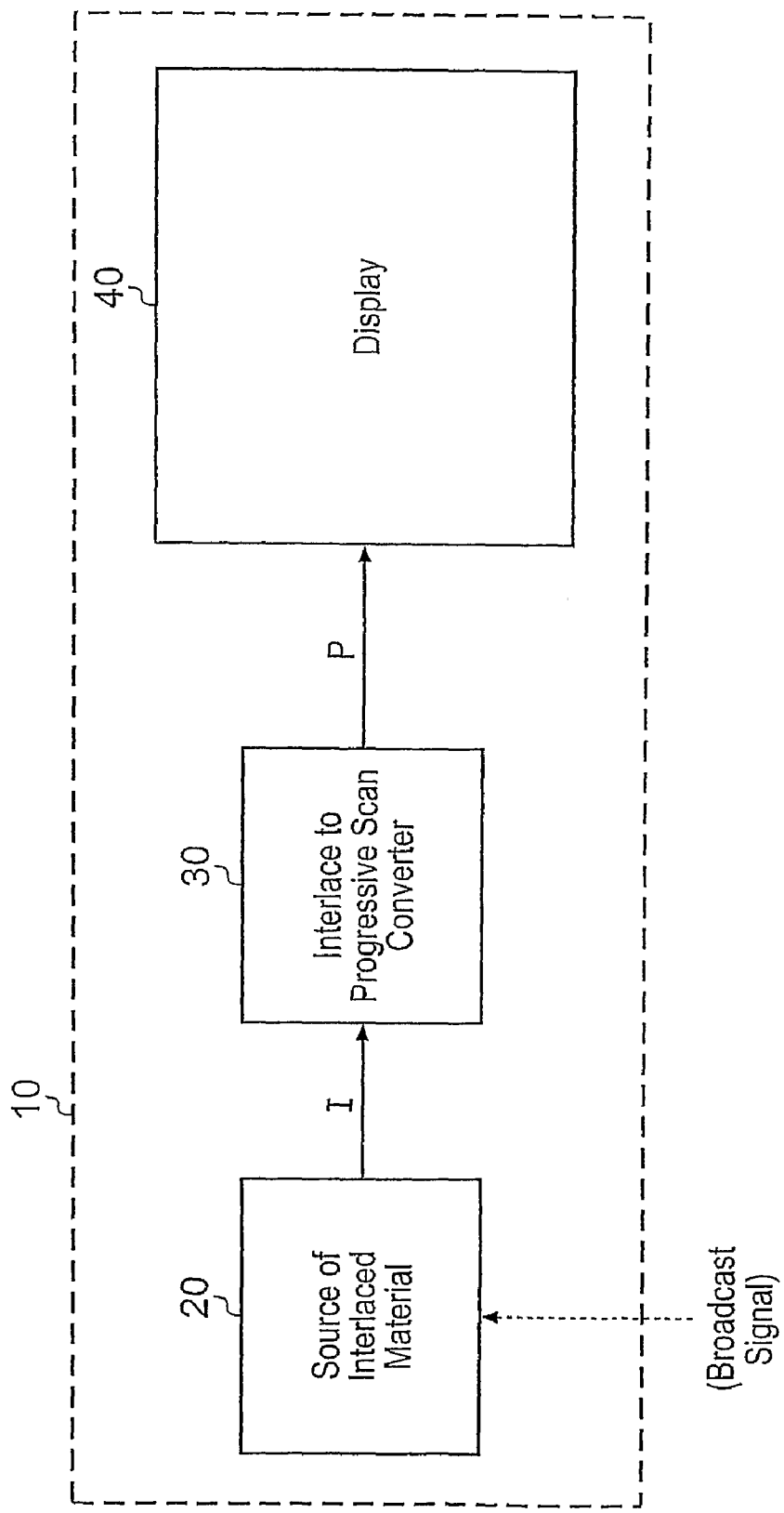

| | | |
|---|---|---|
| 5,689,305 A | 11/1997 | Ng et al. |
| 6,519,369 B1 | 2/2003 | Kondo et al. |
| 6,799,246 B1 | 9/2004 | Wise et al. |
| 2002/0171759 A1 | 11/2002 | Handjojo et al. |
| 2005/0207496 A1* | 9/2005 | Komiya et al. .......... 375/240.16 |
| 2008/0259207 A1* | 10/2008 | De Haan et al. .............. 348/452 |

* cited by examiner

Field frequency spectrum

LP/HP filter-bank response

GENERATING OUTPUT PIXELS OF AN OUTPUT IMAGE FROM ONE OR MORE INPUT IMAGES USING A SET OF MOTION VECTORS HAVING A SUB-PIXEL ACCURACY

This invention relates to image processing.

There are several circumstances in which an image of an output video signal is derived by interpolation or the like from one or more images of an input video signal. Examples include video standards conversion, where new temporal image positions are introduced, scan conversion such as interlaced to progressive scan conversion, and resolution alteration (e.g. up-converting from standard definition to high definition). Of course, more than one of these could be performed as a composite or single operation; and of course, the list is by way of an example rather than an exhaustive definition.

Taking the specific example of interlaced to progressive scan conversion, various options are available to generate an output progressive scan frame from one or more input interlaced fields.

If no image motion is present, then the output frame can be formed as a simple combination of two adjacent input fields, one field providing the odd pixel lines of the frame, and the other field providing the even pixel lines. This offers both simplicity, in terms of processing requirements, and accuracy.

But if motion is present, other techniques have to be used. One such technique is intra-field processing, where the "missing" pixels in a particular field are derived from other pixels within that field. This lacks the accuracy of the simple combination described above, because—in comparison with the combination of two fields—only half the information is being used to generate the output frame. Another technique is motion-dependent processing, where image motion from field to field is detected, allowing the missing pixels to be interpolated between image positions representing a moving object in two or more fields. Motion-dependent processing allows improved accuracy but at the expense of potential aliasing problems, given that the output pixels are being derived from two or more sub-sampled interlaced source fields.

A development of motion-dependent processing is to derive motion vectors (indicating inter-image motion) to sub-pixel accuracy. An output pixel is generated using such motion vectors, but it is possible (indeed, likely) that the output pixel is not exactly spatially aligned with a required pixel position in the output image. Therefore, a spatial filter is applied to generate, from one or more of the output pixels, a pixel at the required pixel position.

This invention provides image processing apparatus in which output pixels of an output image are generated from one or more input images using a set of motion vectors having a sub-pixel accuracy, the apparatus comprising:

a motion vector allocator for allocating motion vectors in the set to pixels of the output image, the motion vector allocator being arranged to compare a current output pixel with test image areas pointed to by motion vectors in the set to detect a most suitable motion vector for the current output pixel; and a pixel generator for generating the output pixels, the pixel generator operating in a first mode if the output pixel is within a threshold displacement from an image region having substantially different motion characteristics to those of that output pixel, and in a second mode otherwise, the pixel generator comprising a spatial filter for generating an output pixel value at a required pixel position to a sub-pixel accuracy;

in which:

the pixel generator is operable, in the first mode, to apply its spatial filter to a group of pixel values derived from the input image(s) such that the group does not extend into an image area having substantially different motion characteristics, at least one such pixel value being applied to more than one non-zero filter tap; and the pixel generator is operable, in the second mode, to apply its spatial filter to a group of pixel values derived from the input image(s), there being one such pixel value for each non-zero filter tap.

The invention addresses the problem of how to handle image or object edges where spatial filters are involved, by the elegantly simple measure of using input pixel values from within an area as the input to the spatial filter.

Further respective aspects and features of the invention are defined in the appended claims.

Figure 2:
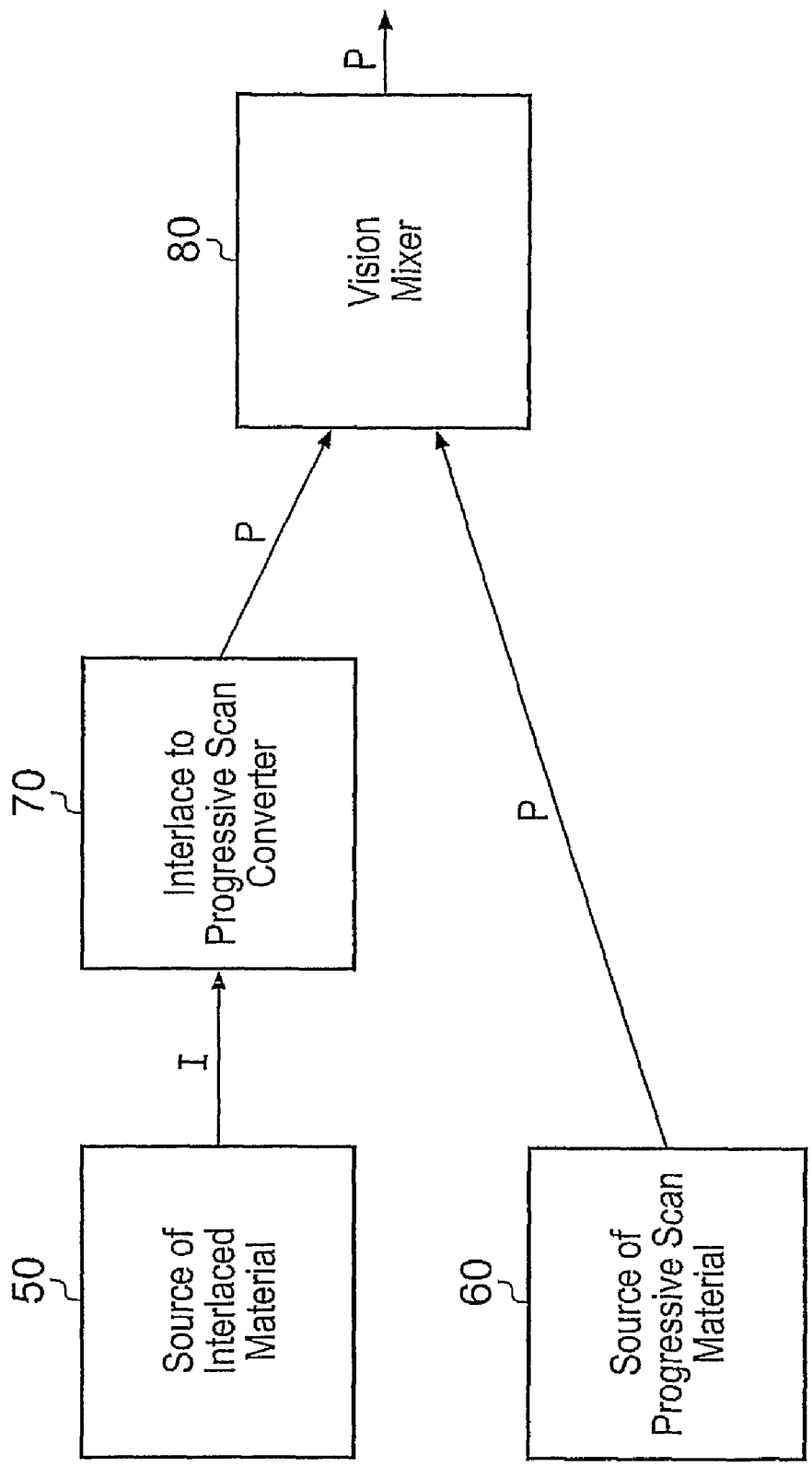
Figure 3:
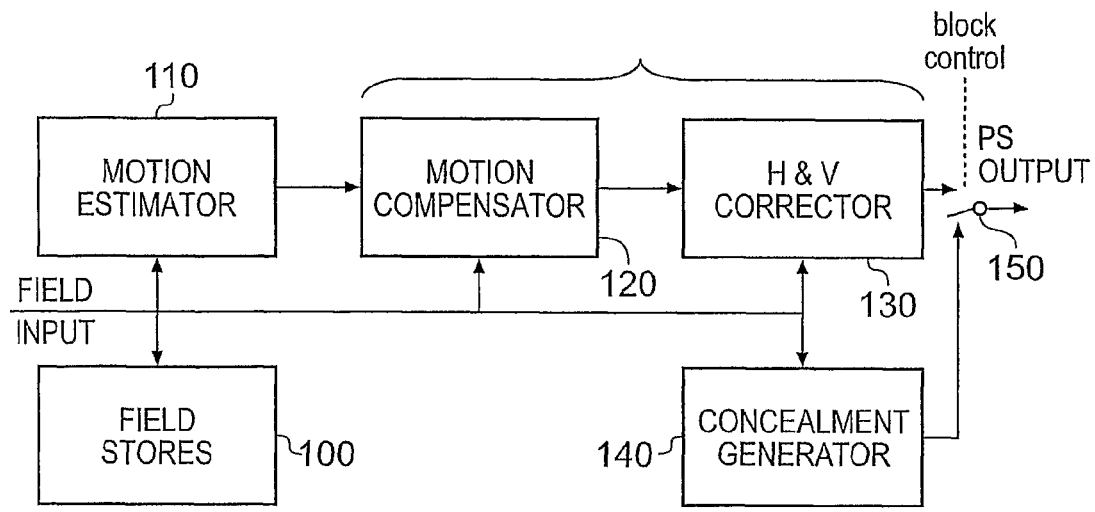
Figure 4A:
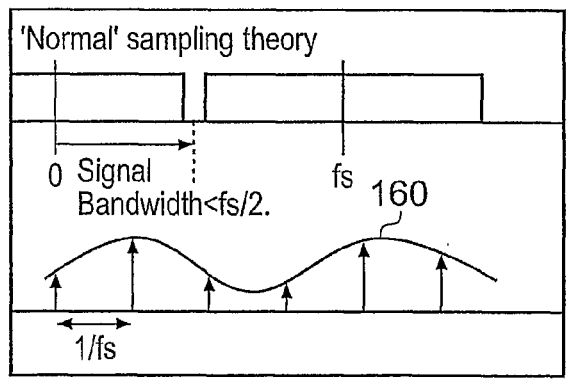
Figure 4B:
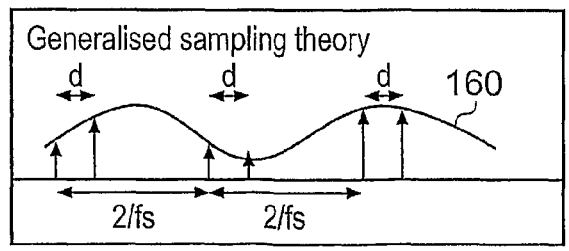
Figure 5:
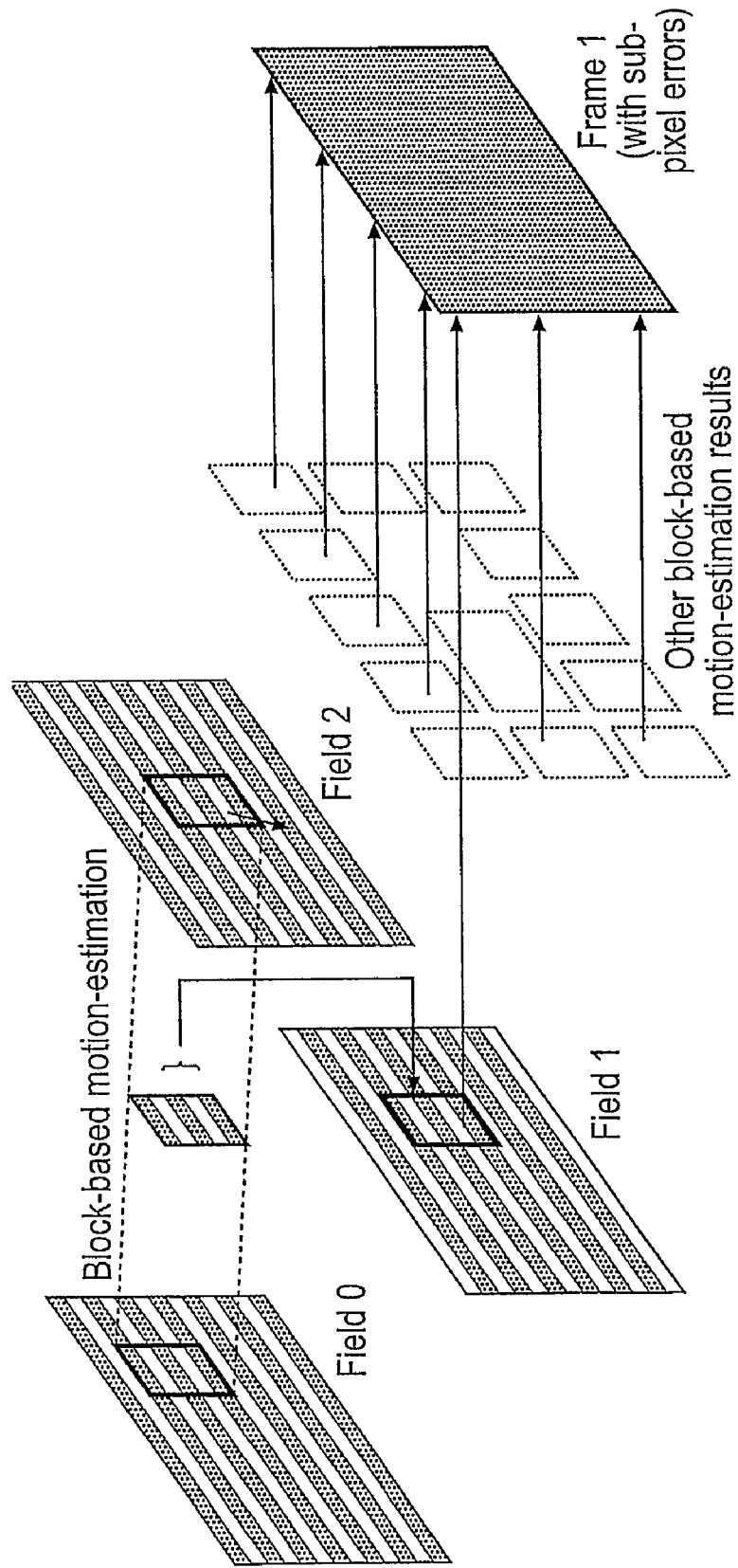
Figure 6:
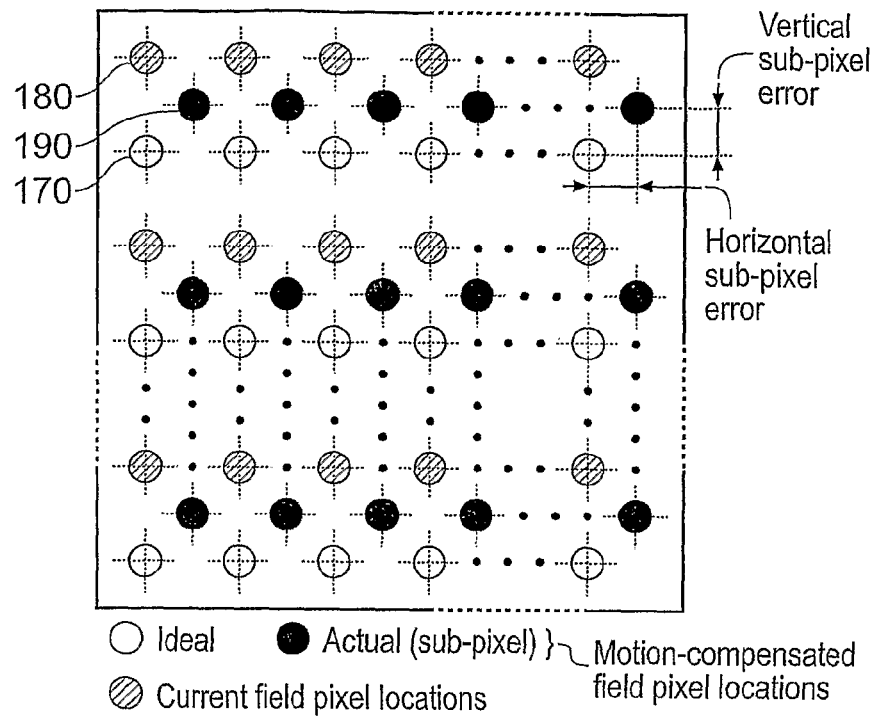
Figure 7A:
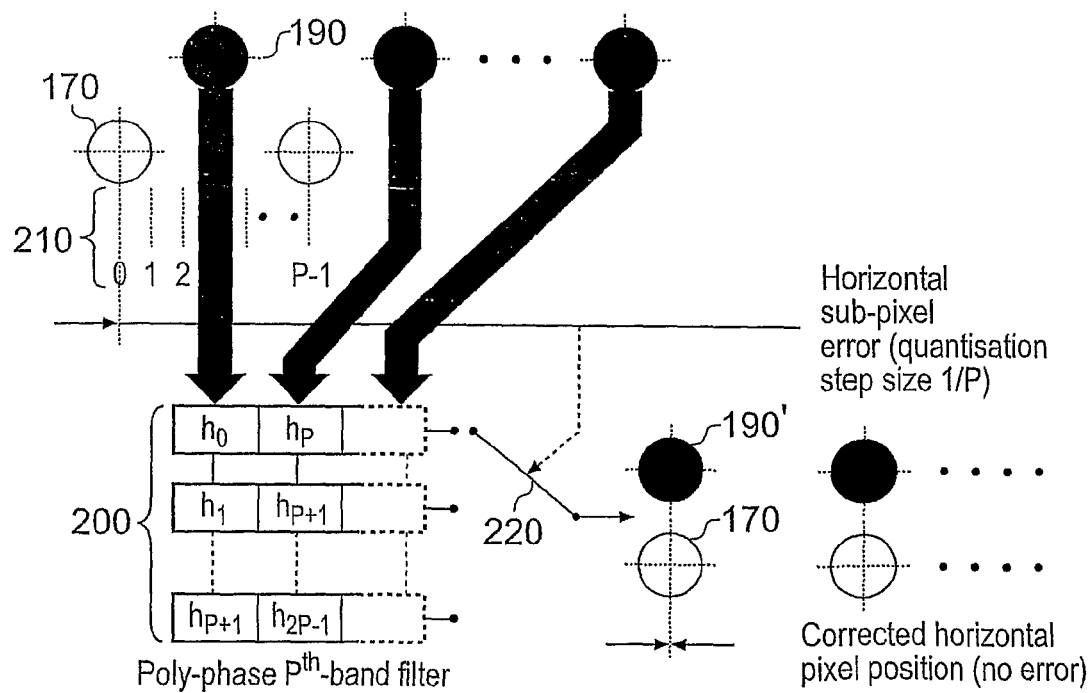
Figure 7B:
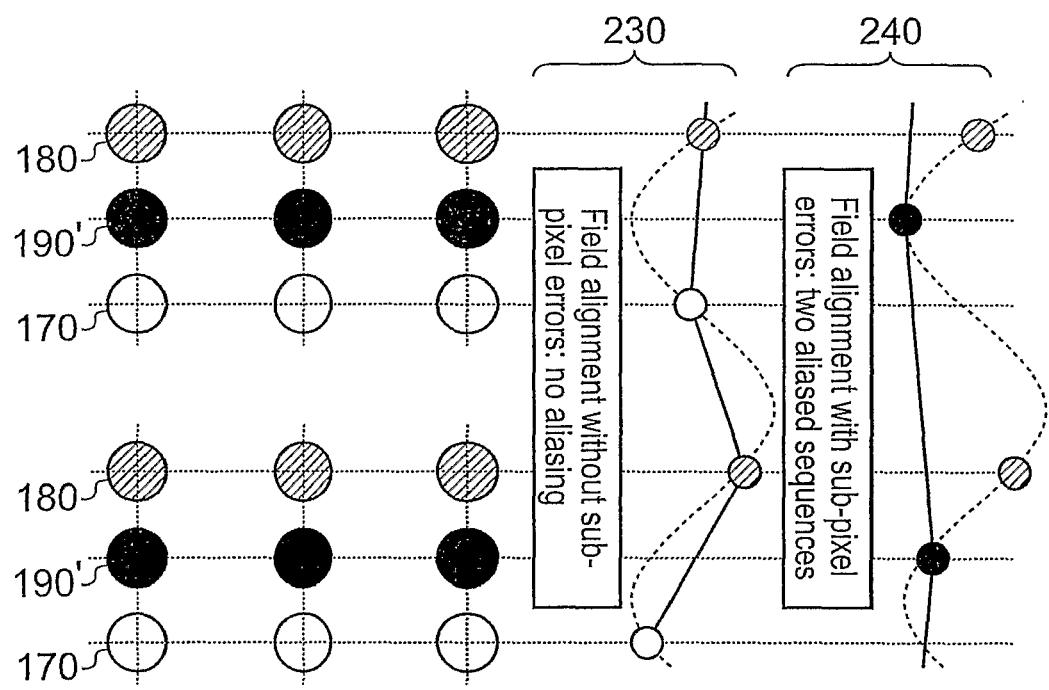
Figure 8A:
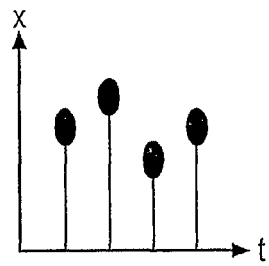
Figure 8B:
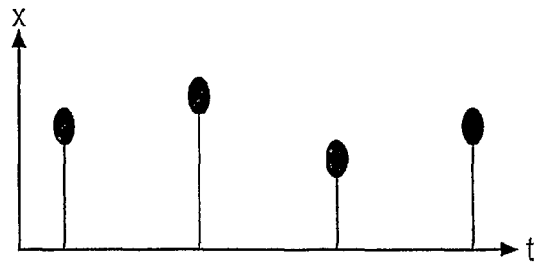
Figure 8C:
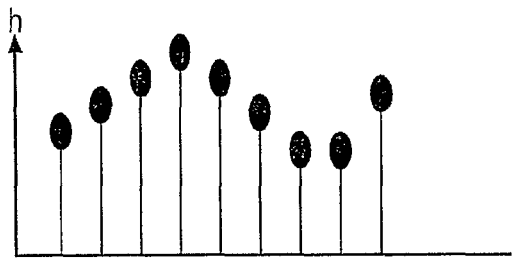
Figure 9:
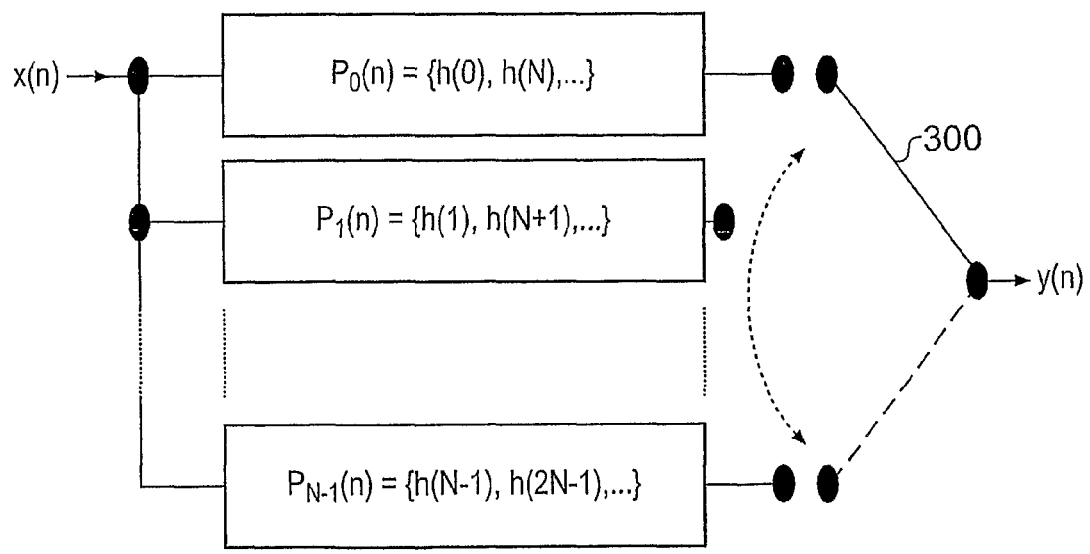
Figure 10:
Figure 11:
Figure 12:
Figure 13:
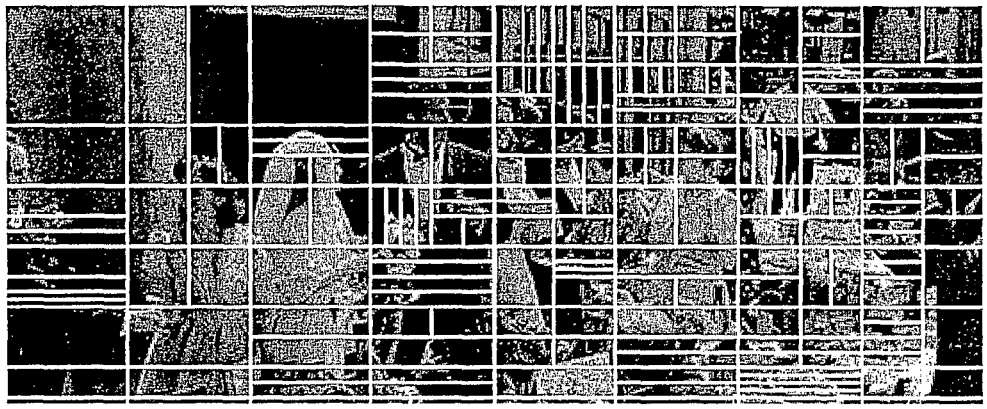
Figure 14:
Figure 15:
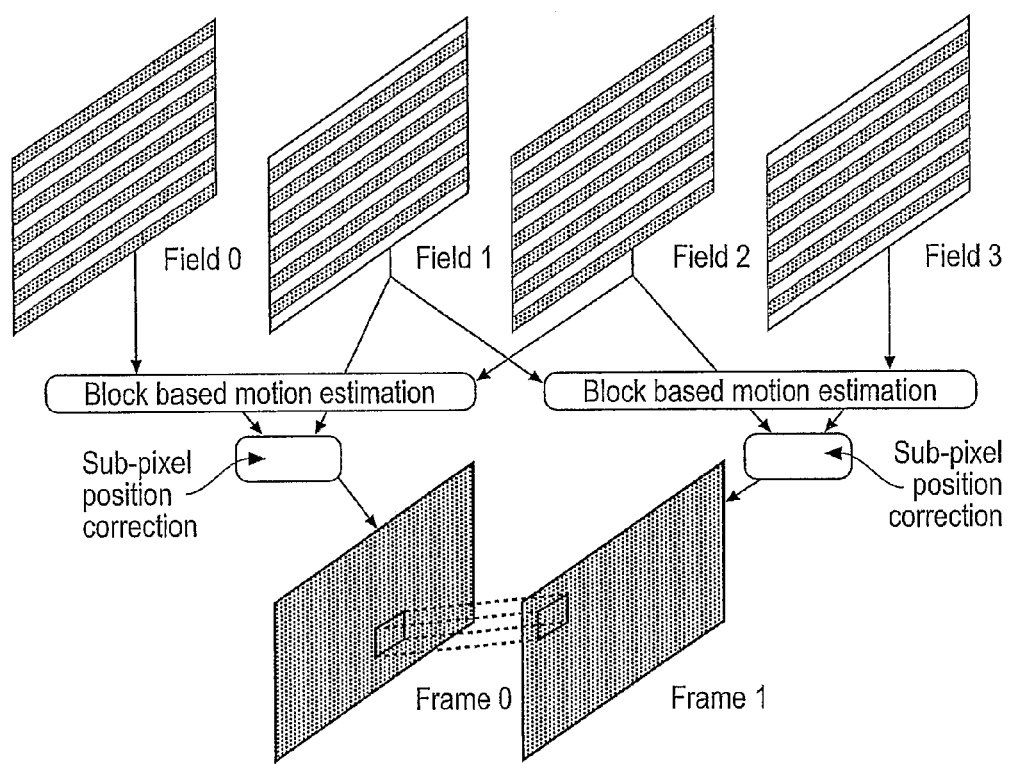
Figure 16:
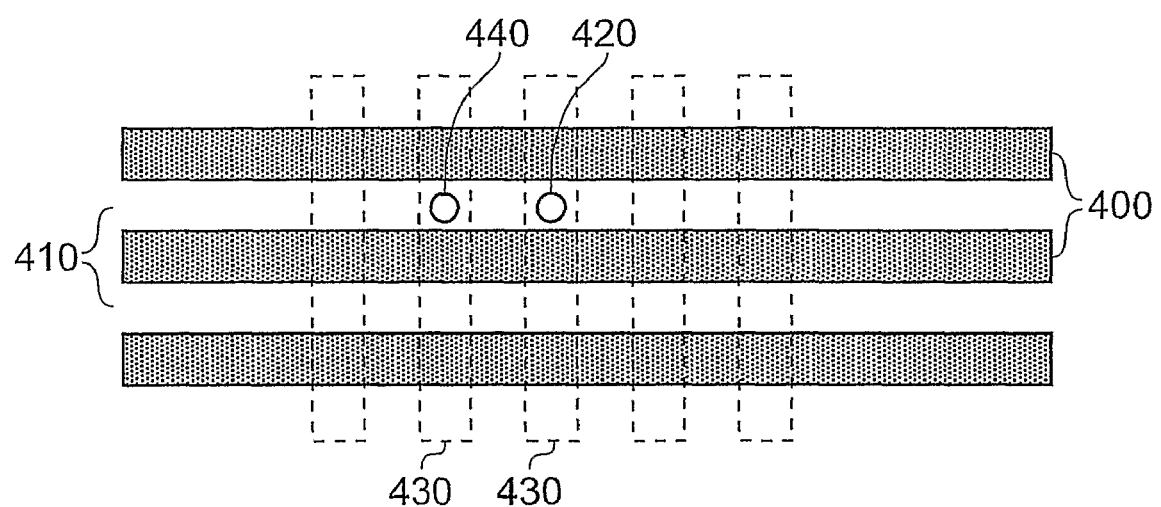
Figure 17A:
Figure 17B:
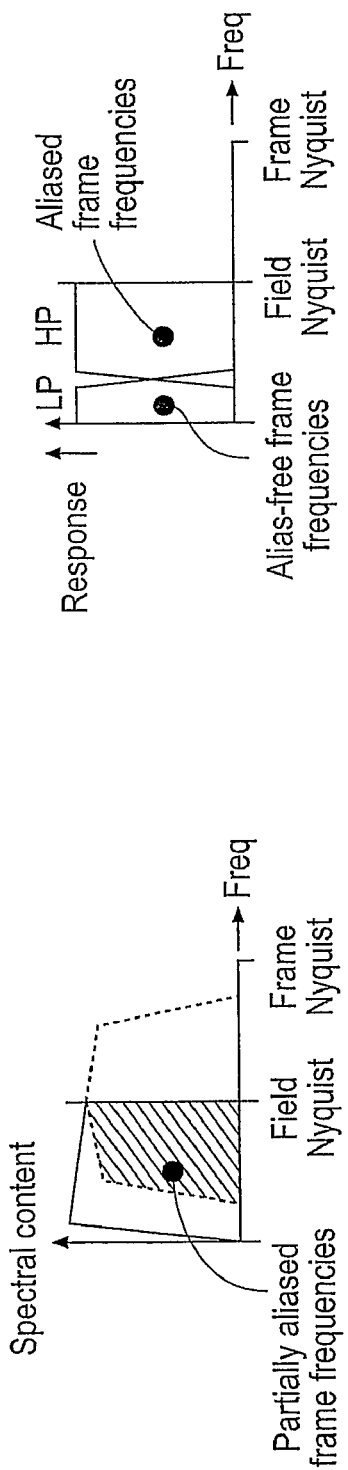
Figure 17C:
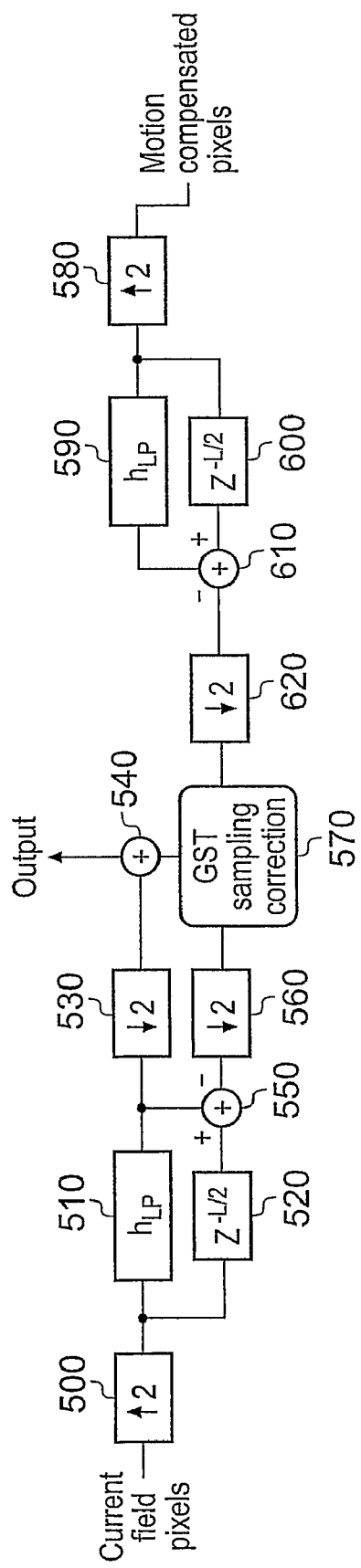

Embodiments of the invention will now be described, by way of example only, with reference to the accompanying drawings in which:

FIG. 1 schematically illustrates a flat-screen display arrangement;

FIG. 2 schematically illustrates video mixing operation in a studio environment;

FIG. 3 schematically illustrates an interlaced to progressive scan converter;

FIGS. 4a and 4b schematically illustrate "normal" and generalised sampling theory (GST);

FIG. 5 schematically illustrates a part of a conversion process using sub-pixel positional correction;

FIG. 6 schematically illustrates sub-pixel errors;

FIG. 7a schematically illustrates horizontal sub-pixel correction;

FIG. 7b schematically illustrates vertical sub-pixel correction;

FIGS. 8a to 8c schematically illustrate polyphase interpolation;

FIG. 9 schematically illustrates a commutator;

FIG. 10 shows an example image;

FIG. 11 schematically illustrates edge detection using a Gx Sobel operator;

FIG. 12 schematically illustrates edge detection using a Gy Sobel operator;

FIG. 13 schematically illustrates a block match size map;

FIG. 14 schematically illustrates a block match vector acceptance result;

FIG. 15 schematically illustrates motion vector verification;

FIG. 16 schematically illustrates vertical half-band filtering;

FIGS. 17a to 17c schematically illustrate aspects of GST filter design; and

FIGS. 18a to 18e schematically illustrate aspects of dealing with moving image objects.

FIG. 1 schematically illustrates a flat screen display arrangement 10 comprising a source of interlaced video material 20, an interlace to progressive scan converter 30 and a display panel 40 such as a liquid crystal (LCD) or plasma display. This illustrates a typical use of interlace to progressive scan conversion, in that many broadcast signals are in the interlaced format whereas many flat panel displays operate most successfully in a progressive scan format. Accordingly, in FIG. 1, a broadcast signal received by the source of interlaced material 20 is used to generate an interlaced signal for display. This is passed to the interlace to progressive scan converter 30 to generate a progressive scan signal from the interlaced signal. It is the progressive scan signal which is passed to the display 40.

It will be appreciated that the source of interlaced material 20 need not be a broadcast receiver, but could be a video replay apparatus such as a DVD player, a network connection such as an internet connection and so on.

FIG. 2 schematically illustrates a video mixing operation in a studio environment, in order to give another example of the use of interlace to progressive scan conversion. Here, a source of interlace material 50 and source of progressive scan material 60 are provided. These sources could be cameras, video replay apparatus such as video tape recorders or hard disk recorders, broadcast receivers or the like.

The interlaced output from the source of interlaced material 50 is supplied to an interlace to progress scan converter 70 to generate a progressive scan signal. This can be processed by the vision mixer 80 along with the progressive scan material from the source 60 to generate a processed progressive scan output. Of course, the progressive scan output of the vision mixer 80 can be converted back to an interlaced format if required, e.g. for subsequent broadcast or recording. It will also be appreciated that the vision mixer 80 is just one example of video processing apparatus; instead, a digital video effects unit, for example, could be used at this position in FIG. 2.

FIG. 3 schematically illustrates an interlaced to progressive scan converter which receives a field-based input signal and generates a progressive scan frame-based output signal. In the present embodiment the output signal has one frame for each field of the input signal.

The converter of FIG. 3 comprises one or more field stores 100, a motion estimator 110, a motion compensator 120, a horizontal and vertical positional corrector 130, a concealment generator 140 and an output selector 150. The motion compensator 120 and the positional corrector 130 are shown as separate items for clarity of the description; in reality, it is likely that both of these functions would be carried out as part of the same operation.

An input field is stored in the field store(s) 100 and is also passed to the motion estimator 110. Using block-based motion estimation techniques to be described below, and with reference to the field store(s) 100, the motion estimator 110 derives motion vectors indicative of image motion between the current field and another field (e.g. the preceding field). The motion vectors are derived to sub-pixel accuracy.

The motion compensator 120 is used to generate "missing" pixels to augment the pixels of the current field, in order to generate an output frame. So, the pixels of the current field are retained, and the empty lines between those pixels are populated with pixels from the stored field(s) using motion compensation. The operation of the motion compensator 120 will be described in more detail below.

The horizontal and vertical positional corrector is employed because the output of the motion compensator, while correct to the nearest pixel, is normally not exactly aligned with the sampling points (pixel positions) in the output frame. This is because motion estimation is performed to sub-pixel resolution.

Horizontal positional errors are corrected using polyphase filtering. Vertical positional errors are corrected using a filter employing a special case of the so-called Generalised Sampling Theorem. These operations will be described in more detail below.

The concealment generator 140 is arranged to provide a pixel value in case the motion dependent compensation arrangement fails to do so. It might be needed in the case of a failure to complete the processing needed to derive correct motion vectors in respect of each pixel, for example because the nature of the images made deriving motion vectors inaccurate or processor-intensive. In actual fact, the concealment generator is included within the functionality of the motion compensator/positional corrector, but is shown schematically in FIG. 3 as a separate unit. Similarly, the selector 150 is part of the functionality of the motion compensator/positional corrector/concealment generator, but is shown separately to illustrate its operation. The selector 150 selects (on a block-by-block basis) a concealment pixel when a motion compensated pixel cannot be generated.

FIGS. 4a and 4b provide an overview of the generalised sampling theory (GST). In particular, FIG. 4a schematically illustrates the "normal" sampling theory, whereas FIG. 4b schematically illustrates the GST.

In FIG. 4a, the familiar situation is illustrated whereby a signal having a maximum frequency of fs/2 can be perfectly reconstructed by sampling at a rate of fs, which is to say that sampling points occur regularly every 1/fs. This analysis is equally valid for a time-based system or a spatially-based system, i.e. the sampling rate fs can be expressed in samples per second or samples per spatial unit.

FIG. 4b schematically illustrates an instance of the GST. According to the GST, it is not in fact necessary to sample with one fixed sampling period (1/fs). Instead, a signal having a maximum frequency of fs/2 can be perfectly reconstructed if it is sampled by two sampling points every period of 2/fs.

FIG. 5 schematically illustrates a part of the conversion process carried out by the apparatus of FIG. 3, to illustrate the need for GST-based positional correction. Fields 0, 1 and 2 are evenly spaced in time. The intention is to create a progressively scanned frame, frame 1, using existing pixels from field 1 and also motion compensated pixels (to fill in the missing lines) derived in this instance from fields 0 and 2 by a motion compensation technique using block based motion estimation. The missing pixels are inserted between the lines of pixels in field 1 to create frame 1. But the motion compensated pixels in frame 1 have sub-pixel positional errors. Note that in other embodiments the missing pixels are derived from one field only.

As mentioned above, the sub-pixel positional errors are corrected by two techniques. Horizontal sub-pixel errors are corrected using polyphase filtering. Vertical errors are corrected using GST filtering.

FIG. 6 schematically illustrates these sub-pixel errors. White circles 170 indicate the required positions of motion compensated pixels to fill in the missing lines of field 1 to produce frame 1. Grey pixels 180 indicate the positions of real pixels from field 1. Dark pixels 190 indicate the positions of the motion compensated pixels in this example. It can be seen that the motion compensated pixels 190 are close to, but not exactly aligned with, the required positions 170.

FIG. 7a schematically illustrates the use of a polyphase filter to correct the horizontal position. The technique of polyphase filtering will be described in more detail below, but in general terms a filter 200 receives a group of motion compensated pixel values as inputs. The filter comprises P sets of filter taps h, each of which sets is arranged to generate an output value at a different phase (in the case of pixels, horizontal position) with respect to the input motion compensated pixels. The phases are indicated schematically (210) in FIG. 7a as running from 0 (in this example, phase 0 is aligned with a left-hand real pixel) to P−1 (in this example, phase P−1 is aligned with a right hand real pixel). In other words, the horizontal positional error is quantised to a sub-pixel accuracy of 1/P pixel spacings.

A schematic commutator 220 selects the correct set of taps to generate a new pixel value 190' which is horizontally aligned with a real pixel 170.

FIG. 7b schematically illustrates the use of the GST to correct the vertical position. Here, the pixels 190' are shown having had their horizontal position corrected as described above.

In the vertical direction, in each spatial period of two (frame) lines, two pixels are provided: a real pixel 180 from field 1, and a horizontally-corrected pixel 190'. The presence of two valid sampling points in a two-line spatial period means that the "original" value of each respective pixel 170 can be recovered by a vertical filtering process. A group of properly vertically-aligned pixels 230 suffers little or no aliasing. On the contrary, a group of incorrectly vertically aligned pixels 240 suffers with vertical aliasing.

The equation of a suitable GST filter is as follows:

$$x_c(n) \sim \sum_{k=-L/2}^{+L/2} x_c(kN+n_0) \frac{1}{\sin(p(n-n_1)/N)} (-1)^{2k}$$

$$\prod_{q=0}^{1} \sin(p(n-n_q)/N)/(n-kN-n_0) + \sum_{k=-L/2}^{+L/2} x_c(kN+n_1)$$

$$\frac{1}{\sin(p(n-n_0)/N)} (-1)^{2k} \prod_{q=0}^{1} \sin(p(n-n_q)/N)/(n-kN-n_1)$$

where 2 sub-sampled data sequences form sample sets $nN+n_p$ (p=0 ... (N−1)), N is the maximum number of discrete equally spaced samples per Nyquist period and n is a sample number.

In summary, therefore, the GST can be used to reconstruct a quasi-perfect progressive frame from two or more interlaced fields. The process involves the copying of pixels from one field and positionally restoring the remaining pixels (obtained from the other field) in the progressive scan frame.

Subsequently, horizontal phase correction and vertical GST reconstruction yields pixel values that complete a quasi-perfect progressive scan frame.

However, to restore the position and phase of pixels from the second field, motion vectors accurate to some fraction of the spatial sampling resolution must be known. Accordingly, there now follows a description of the operation of the motion estimator 110.

Motion estimation in general aims to detect the magnitude and direction of real vectors using some local minimisation of error between an image and spatially shifted versions of it. However, if image data is sub-sampled (as is the case for fields of an interlaced source), there may be little or even zero correspondence between versions with different displacements, inhibiting the detection of motion this way.

Several motion estimation methods are known. These include:

1. Gradient method: in its simplest form, this technique assumes a constant luminance gradient over a localised area to translate changes in pixel or small-block-average luminance into motion using a linear (straight-line) relationship.

2. Block based method: this method generally involves block matching between two or more successive frames of a video sequence to establish the correct displacement. The match criterion used is a minimum pixel difference measurement, usually the MSE (Mean Squared Error) between corresponding blocks.

3. Fourier-transform method: this technique is generally the same as block based methods, but uses the Fourier transform to calculate rotational convolution in two dimensions. This significantly reduces the computational effort required to compute block search results over a large area.

Block based methods are generic in operation (i.e. the outcome of a block based search should be the same as the outcome after applying the Fourier method) and yield a more accurate result mathematically than the gradient method supported by its associated assumptions.

The block match method is used in the present embodiment, but it will be appreciated that other methods could be used.

However, a known disadvantage of the block search method is calculation of the wrong motion vector by an incorrect MSE minimisation search. This can occur for at least three possible reasons:

1. Blocks chosen for the search lack sufficient detail to ensure any displacement yields an MSE larger than zero displacement.

2. The summation within the MSE calculation can be overloaded with pixel differences, causing larger errors to be reported for block displacements closer to the truth than other clearly incorrect displacements.

3. Blocks chosen for the search auto-correlate to produce a lower (intra-frame) MSE than that obtainable using true inter-frame vector displacement of the block.

These possible failings are addressed in the present embodiment using a specific technique for each one.

Referring now to FIGS. 8a to 8c, poly-phase interpolation is the method used to analyse sub-pixel motion between successive frames, imparted as a result of non-integral pixel shifts of the original source image caused by the process of generating an interlaced field. Poly-phase interpolation for a sub-block MSE search can be viewed as a computationally-efficient method of firstly inserting samples in a data sequence by applying the original bandwidth constraint, and secondly selecting a regular set of samples with the desired sub-pixel shift.

A method of poly-phase interpolation can be derived from the schematic diagrams of FIGS. 8a to 8c. FIG. 8a schematically illustrates an original discrete-time sampled signal. FIG. 8b schematically illustrates the original signal of FIG. 8a, zero-padded. In other words, zero-valued samples have (at least notionally) been inserted between "real" samples of the signal of FIG. 8a. FIG. 8c schematically illustrates the signal of FIG. 8b, having been filtered to reapply the original bandwidth constraint (i.e. the bandwidth of the signal of FIG. 8a).

Both the original signal and the filter are assumed to be discrete-time series sampled at instances 0+nT, where n=0, 1, 2, etc. For the purposes of simplifying the present analysis, the substitution T=1 is made to normalise the sampling period.

The original signal referred to as x(n) (rather than x(nT), because T=1) is firstly zero-padded to reflect the interpolation ratio. For example, interpolation by a factor N requires insertion of N−1 zeros between original (real) samples to yield a sample sequence length N times the original.

Convolution of the zero-padded input sequence with a (length L+1) filter h(n) applying the original bandwidth constraint (now Nth-band) yields the sequence of results $$y(0)=x(0)h(0);$$

$$y(1)=x(1)h(0);$$

$$\vdots$$

$$y(N-1)=x(N-1)h(0)\ldots$$

$$y(N)=x(N)h(0)+x(0)h(N)+\ldots$$

$$\vdots$$

Clearly, y(0), y(N), y(2N), etc results are computed as a convolution of x(n) with filter coefficients h(0), h(N), h(2N), etc. Similarly, y(1), y(N+1), y(2N+1), etc are computed by convolution with filter coefficients h(1), h(N+1), h(2N+1), etc. These short-form computations can be neatly expressed in the form of a schematic commutator 300 selecting between coefficient sets P as shown in FIG. 9.

The commutator selects the sub-pixel phase required. An efficiency derives from this operation, as only the multiplications and additions required to provide that particular result need to be computed. Generally, a gain factor of N is applied at the output as the zero-padded original sample sequence is considered to have 1/Nth the energy of the original.

The poly-phase computation is used both vertically and horizontally in the block-matching algorithm. Accordingly, the motion vectors are generated with sub-pixel resolution.

The maximum search range in pixels (i.e. the maximum tested displacement between a block in one field and a block in another field) is translated into the number of sub-pixels this represents. For any given offset from zero the required phase is the modulus of this shift measured in sub-pixels divided by the interpolation ratio. The absolute displacement in pixels is the integer division of this shift by the interpolation ratio.

A method of variable block size selection is used for robust frame-based motion estimation. Each block is allocated a minimum and maximum power-of-two size in the horizontal (upper-case X) and vertical (upper-case Y) directions.

To begin, the sizes of all blocks are set to a predetermined maximum power of two (for example 5, giving a maximum block size of 25 pixels) but with the frame's outer dimensions as a constraint such that block sizes can be reduced in X and/or Y from the outset to ensure edge fitting.

An iterative process of division of each block into two halves either vertically or horizontally (the later takes precedence) is undertaken, based on edge content detected and measured using the Sobel operator. The general principle is that a block is divided (subject to a minimum block size—see below) if it is found to contain more than a desired edge content.

The Sobel operator takes the form of and is applied as two separate two-dimensional 3*3 coefficient filters. The first, Gx, shown to the left below, detects vertical edges and the second, Gy, shown to the right below, detects horizontal edges.

Gx

| -1 | 0 | 1 |
|----|---|---|
| -2 | 0 | 2 |
| -1 | 0 | 1 |

Gy

| +1 | +2 | +1 |
|----|----|----|
| 0  | 0  | 0  |
| -1 | -2 | -1 |

Due to the coefficient value range of Gx and Gy, these filters exhibit maximum gains of +4 and −4 when convolved with image data in the range 0 to 1. The results obtained from applying these filters are therefore first normalised to the range −1 to +1 through division by 4. (As an alternative, normalised coefficients could be used in the Sobel operators)

FIG. 10 illustrates one image of a source video sequence against which some of the present techniques were applied. The source video sequence was actually generated artificially by starting from a 4096*1696 pixel basic image. Whole-pixel shifts, simulating camera panning, were applied to impart motion to a sequence of such images. The final output fields were obtained by nth-band filtering and subsequent sub-sampling by the same factor, where a value of n=8 provided a finished size of 512*212 pixels. So, each field in the source video sequence involved motion with respect to neighbouring fields and also represented a sub-sampled version of the basic image.

Taking the absolute values of each operator's (i.e. Gx's and Gy's) results in turn and accepting only absolute (normalised) values of 0.2 and above (i.e. applying a "greater-than" threshold of 0.2), the application of Gx and Gy to the source image shown in FIG. 10 produces the two edge-detection images shown in FIGS. 11 and 12. In particular, FIG. 11 schematically illustrates edges detected using the Gx operator and FIG. 12 schematically illustrates edges detected using the Gy operator. Pixels are therefore identified and flagged as "edge" pixels.

With regard to each pixel block proposed for use in block matching, the total count of detected edge pixels (of minimum normalised magnitude 0.2) is subject to further threshold testing to establish whether the block may be split. Each block is notionally sub-divided into four quarters (vertically and horizontally by two).

If each quarter contains both a horizontal and vertical edge pixel count greater or equal to the number of pixels in the predetermined minimum (indivisible) block size, the block division is accepted. However, if only the horizontal count is deficient, block quarter boundaries are merged and vertical division by two is accepted. Finally, if only the vertical count is deficient, block quarter boundaries are merged and horizontal division by two is accepted.

If both counts are deficient the block is not divided, marking the stopping criterion in each case. When there are no more sub-divisions, the block-match mapping is complete. Applying this technique to the source image shown in FIG. 10 with edge threshold results as shown in FIGS. 11 and 12 results in the block division pattern shown schematically in FIG. 13.

To prevent or at least avoid the mean squared error calculation used to assess block similarity from returning erroneous minima, pixel difference limiting is employed to prevent saturation of the sum for block displacements within a small range around the ground truth. The standard MSE calculation used in block matching is shown in Equation 1.

$$MSE = \sqrt{\frac{\sum_{x=0}^{N-1}\sum_{y=0}^{M-1}(A_{x,y} - B_{x+j,y+k})^2}{N*M}} \qquad \text{Eq. 1}$$

In Equation 1 the block size is N*M pixels and is indexed as $A_{x,y}$ in one frame and $B_{x+j,y+k}$ in the next frame, where j and k are the whole-pixel horizontal and vertical displacements applied during the minimisation search. Of course, $B_{x+j,y+k}$ references the appropriate phase of image according to those derived using FIG. 9 and the modulus of the actual displacement required (in sub-pixels) for this analysis.

The kernel difference calculation is replaced with one that limits the overall error per pixel, as shown in Equation 2.

$$MSE = \sqrt{\frac{\sum_{x=0}^{N-1}\sum_{y=0}^{M-1} \min\{(A_{x,y} - B_{x+j,y+k})^2, q\}}{N*M}} \qquad \text{Eq. 2}$$

In Equation 2, q is an appropriate constant. For image data in the range 0 ... 1, a value of $q=10^{-2}$ has been found to work well.

The limiting of pixel differences in this way has been found to provide greater definition and distinction of the ground truth displacement on the complete two-dimensional error surface generated by the block search.

To prevent or at least reduce erroneous (or "rogue") vector generation by the block-search method, advanced warning of the potential for a rogue result to occur can be obtained by block intra-frame (auto) correlation.

To apply this technique, a block search is first performed within the required range in the same image. The minimum MSE is recorded. A block search in the second frame is then performed as before, however if the smallest MSE recorded is greater than the intra-frame MSE, a vector resolved from the search is discarded.

A maximum MSE criterion can also be applied using intra-frame correlation results. By only allowing displacements of at least one sub-pixel in X and Y, a measure of the worst permissible MSE for a confident match can be obtained. This then is the upper limit for any inter-frame MSE when the resolved displacement (motion vector) should ideally be within one sub-pixel of the ground truth.

The validity of each vector according to the described method of rogue vector elimination is shown in FIG. 14, where only those blocks which the algorithm confirms to provide true motion estimation results are given an outline.

Further techniques for applying motion vector estimation to the method of interlaced to progressive frame conversion using the generalised sampling theorem will now be described.

Robust frame-based motion vector estimation has already been described above. However, in the present embodiment it is the frame data that does not exist and is to be reconstructed using the GST. Frame data cannot be created without quasi-perfect motion vectors to restore pixel positions from one field into the other and detect the phase alignment for GST filter selection. Neither frame data nor perfect motion vectors can exist without the other but either is difficult to derive in the first place.

One option is field-based motion estimation. Unfortunately, field data is aliased due to the 2:1 sub-sampling in the conversion from a progressive format or due to the inherent workings of the capture device generating the source material for subsequent display using the interlaced format.

Sub-sampling affords no guarantee that a block of image data will match at all with any supposedly identical block in another image as the chosen representation may naturally exclude some or all of the features in one sample set that are apparent in the other. However, there is some likelihood that at least some data will be aliased in the same way, and an inter-field match with the correct displacement will be obtained.

With regard to the three improvements made to ensure robust frame-based motion estimation, not all of these are applicable to field-based estimation.

Firstly, field data may be the result of sampling in a way that excludes significant detail from one or more areas, whereas in reality (or in another instance of the field later in time) this detail is present. Using detail analysis for variable block size selection is therefore not relevant for field data.

However, modification of the MSE calculation kernel to prevent error sum overflow due to large pixel differences is valid for field data. The best case is fields that do not contain aliasing artefacts due to the nature of the original signal content; modification of the kernel calculation therefore enhances the ability of the search algorithm to discern the minimum error attributable to the real displacement vector.

The same can be said for the rogue vector avoidance technique. It is an addition to the block search algorithm and can only improve performance for fields without significant aliasing.

For significantly aliased fields, there are fundamental reasons why the block search algorithm may fail as already discussed—retaining the MSE kernel modification or rogue vector elimination methods will not degrade performance further under these conditions.

The field-based motion estimation algorithm is described below, initially in terms of the replacement for block selection by detail analysis and subsequently by further enhancements that make the technique more successful in field-based systems.

In the GST motion estimation algorithm, block sizes used for field-based MSE searches are variable by power-of-two divisions in X and Y from some maximum initial dimensions. However, these divisions are controlled by an allowable pixel area, below which the block cannot shrink.

This method supports awkward image sizes not dimensioned to be a multiple of any power of two in X or Y while ensuring a sufficient number of pixels are included in the block matching calculation to achieve the desired accuracy of correlation results (i.e. the MSE minimum is the ground truth displacement).

Starting values for block sizes are typically up to $2^6$ in X and Y but with an overall initial minimum area value of 2048 pixels. Final block dimensions as small as $2^2$ in X and Y are supported with a minimum area of $2^5$ pixels.

Motion estimation for the GST includes inter-field block searches for representative motion, intra-field searches for block similarity and inter-frame block displacement verification. Both stages of the algorithm are implemented to support variable block sizes, as will be discussed later.

Application of the sub-pixel motion vector search algorithm to field data generates a distribution of motion vectors around ground truth vectors, even with inclusion of the MSE kernel calculation modification and rogue vector removal technique. This is wholly due to aliasing and the lack of repeatability of image data between fields.

For example, a test sequence in which successive images were shifted in X and Y at a rate of 9 and 3 sub-pixels (⅛ pixels in this example) per frame respectively generated the following distribution of motion vectors in Table 1.

| Displacement in X for minimum MSE, in sub-pixels | Displacement in Y for minimum MSE, in sub-pixels | Number of blocks returning this vector |
|---|---|---|
| 3 | 3 | 4 |
| 18 | 3 | 155 |
| 2 | 3 | 2 |
| 18 | 5 | 3 |
| −6 | 2 | 1 |
| 2 | −2 | 1 |
| 17 | 5 | 3 |
| 20 | 3 | 2 |
| 17 | 3 | 12 |
| 18 | 4 | 3 |
| 15 | 5 | 1 |
| 11 | 5 | 1 |
| 13 | 3 | 2 |
| 14 | 3 | 2 |
| 15 | 3 | 4 |
| 16 | 3 | 3 |
| 11 | 4 | 2 |
| 19 | 3 | 2 |
| 22 | 4 | 4 |
| 15 | 4 | 1 |
| 21 | 3 | 1 |

From Table 1, the most popular vector is X, Y=18, 3 which is indeed correct. Field-based motion estimation is applied between fields of the same type (either even or odd) which means that effectively there is double the motion in X and Y between the frames these fields are generated from. However, by using only collections of field lines, this doubling is subsequently halved in Y and only X is actually reported as twice the actual motion. Hence, a displacement of 9 and 3 pixels in X and Y between frames used to build fields is detected as a displacement of 18 and 3 pixels.

In the example, synthetic panning-only motion ensures one dominant vector is detected. However, actual inter-field motion may be significantly more complex than this. In general, candidate motion vectors are sorted in order of the number of blocks that support them and one or more vectors in order of popularity can be chosen for further processing and verification.

Candidate motion vectors obtained by field search are verified to ensure (or at least increase the likelihood of) their validity. The method used in the present embodiment involves repeated reconstruction of frames from two consecutive (even followed by odd or vice-versa) fields using the GST.

The motion vectors used for reconstruction are those obtained from field-based motion estimation, sorted in order of popularity. Once two successive frames have been reconstructed, block-based matching is employed to verify each vector's correctness.

The block size used for matching is variable, and is based on the fixed-area criterion as described for field block size selection previously.

It is useful to assume the motion being verified is constant across four fields. Vectors obtained from one field pair match can be combined with those from the next field pair match forming the first stage of the filtering process. For example, if a vector is not supported by at least one block from each field pair, it is discarded.

FIG. 15 schematically illustrates the overall process of vector verification. Candidate motion vectors are generated between fields of the same type (even or odd) within the four-field sequence. Combination of these vector lists, sorting in order of popularity and threshold discarding of entries if they do not appear at least twice (for example, once between each field pair) all help to build a prioritised set of vectors that ensure the success of the GST for frame reconstruction.

Once the GST reconstructs two frames using neighbouring fields of the same type, the field vector used for that instance is the one applied to blocks mapped in one frame when compared with the other.

The match criterion is an MSE better than any intra-frame (auto) correlation of the block with a displacement greater than or equal to one sub-pixel. This can be considered to be a threshold relating to the energy and complexity of the video within the block being verified and implies that the motion vector being used by the GST must be correct to within one sub-pixel for the block match between frames to succeed.

This verification threshold works well for all but the least detailed blocks, where the intra-frame error is small and artefacts caused by the GST calculation exceed it.

Blocks that verify motion vectors are committed to the final output frame result. The candidate motion vector list obtained from field analysis can then be referenced for the next most popular vector and the process repeated until the largest possible proportion of the output frame has been derived using the block sizes given by the minimum area constraints.

The acceptance criterion for motion vectors described above can tend to leave a proportion of the reconstructed frame blocks unverified. The MSE threshold set by auto (intra-frame) correlation is particularly stringent and tends to reject blocks if:

1. The source frame detail within the block area is particularly low, generating a very small auto-correlation MSE that cannot be bettered by inter-frame correlation no matter how good the GST reconstruction.

2. The source frame has complex motion (more than one representative vector) within the block area being analysed. No good block match will be obtained between frames due to revealed or covered pixels (though see the discussion of FIGS. 18a to 18e below).

3. As a special case of (2) above, blocks positioned at the edges of the frame suffer a loss of current pixels and gain of new pixels due to panning motion and do not match well with blocks in other frames.

All of these problems can be dealt with to some extent by block size reduction. In the case of (2) and (3) above, smaller blocks will better fit to a part of the frame whose motion can be described by a single vector, refining object and background areas up to, but not including, their outlines.

The minimum block areas for field-based motion estimation and frame-based motion verification are then reduced and the process described above is repeated. Minimum block areas as small as 16 pixels (X and Y dimensions of 4 pixels) are currently permitted in the present embodiment.

The philosophy behind large-to-small block area selection is as follows. In starting with the largest block area of around 2048 pixels, the most accurate field-based motion estimation and frame-based motion verification are obtained. Smaller blocks that may be more susceptible to MSE minima not representing ground truth displacement are dealt with subsequently, such that any small reconstruction errors are better concealed.

After each round of frame-based vector verification is complete, any resolved picture areas are excluded from the block selection for field-based candidate motion vector generation using smaller block areas as follows.

A mask of unresolved frame pixels is constructed and decimated by 2 vertically by simple sub-sampling. This mask is overlaid onto field data for the next round of candidate vector generation. Any field block that is more than 90% complete is excluded from the analysis as any vector that could possibly be resolved using it, already has been.

Other block areas that do not reconstruct with an MSE below the decided threshold are those along the bottom and left edges of the frame that are subject to new pixel gain and current pixel loss due to global panning motion (point 3 above).

Pixels with unresolved motion are replaced with half-band interpolated existing field pixels.

Plain block areas lack high frequency detail that would otherwise constitute aliasing. Their interpolated counterparts are generally subjectively undetectable in the final output image.

In general terms, and purely by way of example, the overall motion estimation algorithm described so far may be set out as the following list of steps. These take place for successive block sizes from the largest motion vector detection block size down to the smallest motion vector detection block size.
1. Generate a list of motion vectors for all block positions using a lowest MSE match criterion between fields 0 and 2, discarding any rogue vectors for which an intra-field similarity is better than any non-zero inter-field similarity found during the block search.
2. Repeat step 1 in respect of fields 1 and 3.
3. Pool the two vector lists. Remove vectors that do not appear at least twice in the pooled list (i.e. twice in either list or once in both lists).
4. Sort the list in order of vector popularity (most frequently occurring vector first)
5. For each vector in the list order:
    5.1 Reconstruct a test output image using field 0 as the current field and field 2 as the motion compensated field, using the selected vector from the pooled, sorted list.
    5.2 Repeat step 5.1 but using field 1 as the current field and field 3 as the motion compensated field.
    5.3 For successive block sizes from the largest verification block size down to the smallest verification block size:
        5.3.1 Obtain an intra-image match threshold block similarity measure using a displacement of one sub-pixel for the block in the test output image created from fields 0 and 2
        5.3.2 Match the block between the test output frame created from fields 0 and 2 and the test output frame created from fields 1 and 3.
        5.3.3 If the inter-test-frame match is better than the intra-frame threshold then accept the vector and commit the area covered by the block in the test output frame created using fields 0 and 2 to the final output image.

Motion generation and motion verification stages therefore work independently and both use variable block sizes (areas of around 2048 [up to 64*32] pixels to start, and as small as 4 pixels [e.g. 2*2] to finish) with a repeated division by 2 for size reduction.

There is an overlap rule that is used in the feedback of the results of motion vector verification for subsequent motion vector verification at a smaller block size. This is needed because complex areas of the final output image may exist due to successful verification at various block sizes, even before the next variable block size is used to generate more motion vectors.

Any blocks that are verified in the final output image are marked as such. A "field-sized" representation of this mask is generated, i.e. a vertically sub-sampled version of a frame mask, where each location in the frame mask is "1" (in this example) if motion for that pixel has been verified (i.e. it is part of a block that has been verified) or "0" if not. The field-sized mask is then used to exclude areas of fields for the next block size motion vector generation. At the next motion vector generation block size, if a block overlaps the mask of already-verified output pixels by more than 90%, it is not used to generate motion vectors. that way, subsequent pools of motion vectors between fields should converge to the motion of unresolved image areas as the remainder of the output frame is resolved/verified. The intention is that dominant motion is always at the top of the pooled candidate motion vector list.

Starting with larger areas, especially when trying to estimate motion using potentially aliased field data, normally generates more accurate vectors requiring subsequent verification. this is a main reason for starting with larger blocks. Motion in objects around the same size or smaller than the block is probably undetected—hence the need to reduce the block size.

Various detailed aspects of the apparatus of FIG. 3 will now be described.

FIG. 16 schematically illustrates a half-band filtering approach. In FIG. 16, rows of known pixels are indicated by shaded rows 410 and rows of motion compensated pixels by white rows 410. Assume that all of the pixels have been successfully motion compensated except for a particular pixel 420. Horizontal and vertical phase (sub-pixel positional) correction is about to be performed.

As part of this, it will be necessary to horizontally phase-correct a pixel (e.g. a pixel 440) adjacent to (or at least within a half-filter length of) the missing pixel 420. To apply the horizontal phase correction a polyphase filter is used, as described above. But such a filter would require a value for the pixel 420 as one of its inputs. There is no such value, so one has to be generated before phase correction of nearby pixels can be performed. Without such a value, the phase correction of the adjacent or nearby pixel 440 will be incorrect. An error of that type would be amplified by a subsequent vertical phase correction, and could lead to a subjectively disturbing artefact on the output frame.

It is therefore appropriate to find a good concealment value for the pixel 420. This is done as follows.

First, vertical half-band interpolation is used to generate a row of vertically interpolated pixel values disposed around the pixel 420, the number of vertically interpolated pixel values being sufficient for each tap of the horizontal polyphase filter. Vertical interpolation filters 430 are schematically indicated in FIG. 16 by vertical broken-line boxes. Each vertical interpolation filter generates a pixel value in the same row as the pixel 420. Note that the motion compensated values in the rows 410 are temporarily laid aside for this process; the vertical half-band filter refers only to real pixel values in the rows 400.

The above process generates a row of half-band interpolated pixel values around the pixel 420. These do not replace any valid motion compensated values in that row, but instead are used just to arrive at a useful concealment value for the pixel 420.

A "reverse" horizontal phase shift is then applied by polyphase filter to this group. The "reverse" phase shift is a phase shift equal and opposite to the phase shift that is to be applied to the nearby or adjacent pixel 440. So, the inputs to this reverse phase shift filter are the half-band interpolated pixels in the group created around the pixel 420. The result of the reverse phase shifting is a concealment pixel value for the pixel 420.

This concealment value for the pixel 420 is then used, as normal, for the horizontal phase shifting of the pixel 440.

This technique can be extended to situations where more than one pixel (within a filter size of a pixel to be horizontally phase shifted) is missing. The missing pixels and those around them are generated by vertical half-band filtering. Then a reverse phase shift is applied to each one. The pixel to be phase shifted is then filtered using the polyphase filter, with at least some inputs to the filter being provided by the reverse phase-shifted pixels.

The motion vectors obtained in this way can then be used by the motion compensator to obtain missing pixels from one or more fields, generally one or two fields which are temporally adjacent to the current field.

FIGS. 17*a* to 17*c* schematically illustrate aspects of GST filter design.

In particular, FIG. 17*a* schematically illustrates a typical spatial frequency spectrum of an interlaced signal. The field contains spatial frequencies up to the field Nyquist limit (half of the field sampling rate), but because of the interlaced sub-sampling process, some of these frequency components will in fact be aliased, as shown by a shaded area in FIG. 17*a*.

However, it has been noted that the frequency content of a progressively scanned frame often does not extend as far as the frame Nyquist limit, which means that when the interlaced field was formed the alias components (which are "folded" about the field Nyquist limit) tend not to extend down to zero frequency.

The present embodiment can make use of this feature of interlaced signals, bearing in mind that the purpose of the GST spatial positional correction filter is to reduce alias effects. In frequency regions where aliasing is not present, it may not be necessary or even appropriate to apply the GST correction.

FIG. 17*b* schematically illustrates a low pass ("LP")—high pass ("HP") filter response, whereby the frequency range up to the field Nyquist limit is divided into a lower frequency region and a higher frequency region. The cross-over point between the two regions is set in this embodiment to about 20% of the field Nyquist limit, based on empirical trials. In general, therefore, it is to be expected that the lower frequency region will not tend to contain any alias frequency components, whereas the higher frequency region will contain alias frequency components.

The filter responses shown in FIG. 17*b* are applied to the pixels on which the GST filter operates. The higher frequency region is subject to GST spatial positional correction, whereas the lower frequency components are not. The two are then added back together. In empirical tests this has been found to give an improvement in signal to noise response of the overall system.

FIG. 17*c* schematically illustrates an arrangement for implementing this filtering and part-correction technique.

In particular, the arrangement of FIG. 17*c* shows the situation after the motion compensation process has been carried out to generate motion compensated pixels from a field of the opposite polarity to the current field.

Referring to the current field pixels, these are upsampled by a factor of 2 at an upsampler 500. Upsampling is used because the low frequency/non-aliased component is being used to create a frame. This process is in fact an upsampling and filtering process—in the implementation it is carried out as interpolation with the 20% filed Nyquist frequency response applied to the filter used.

The upsampled pixels are then supplied in parallel to a low pass filter 510 and a compensating delay element 520. The low pass filter 510 generates the lower frequency region shown in FIG. 17*b*. This is passed to a downsampler 530 and from there to an added 540.

The lower frequency output of the filter 510 is also subtracted from the delayed version of the original signal by a subtractor 550. This generates the higher frequency region which is downsampled by a downsampler 560, the result being passed to a GST correction filter 570.

With regard to the motion compensated pixels, these follow a similar path via an upsampler 580, a low pass filter 590, a compensating delay 600, a subtractor 610 and a downsampler 620, so that the higher frequency components of the motion compensated pixels are passed to the GST filter 570.

The output of the GST filter is added back to the lower frequency components of the current field pixels by the adder 540.

Note that generally speaking, the low frequency component obtained from the known field has little or no motion. The higher frequency contribution from the known field and the unknown filed are treated by the positional correction filters to provide pixel values at the positions required. This gives phase corrected high frequency information. This is added back to the low frequency contribution, which is basically a vertical interpolation of the known field.

Techniques for dealing with object and image edges, and with revealed pixels, will now be described with reference to FIGS. 18*a* to 18*c*.

Figure 18A:
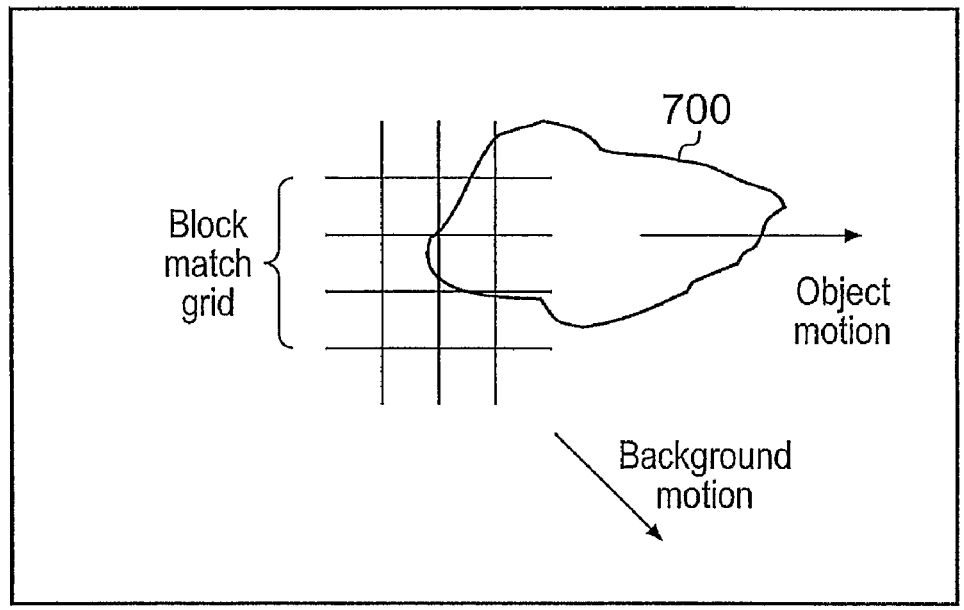

FIG. 18*a* schematically illustrates an image in which an object 700 is moving in a certain direction and the image background is moving in a different direction. A schematic initial block match grid is illustrated, marking the positions of the initial (largest) blocks used in the block match motion vector detection process.

Various potential problems can arise even with the simple situation of FIG. 18*a*. For example, at the trailing edge of the object 700, pixels will be uncovered as the object moves past. Such pixels cannot be derived from a preceding field because they did not exist in that field. At the boundary between the object and the background, it will be difficult to select the correct motion vector. Also, the GST filter as applied to pixels at or very near to the boundary will take in pixel values from the other side of the boundary. So, a filter which is intended to improve the image by applying a sub-pixel correction to a boundary pixel could in fact harm the image by blurring the edge of the object 700.

As described earlier, during the motion vector generation stage, various different motion vectors are generally produced in respect of an image, but for the image of FIG. 18*a* two vectors will be the most frequently occurring. These are a vector representing the motion of the object 700 and a vector representing the motion of the background.

The verification of these vectors should be successful away from the boundary between the object 700 and the background. But the verification process will struggle at the boundary.

Figure 18B:
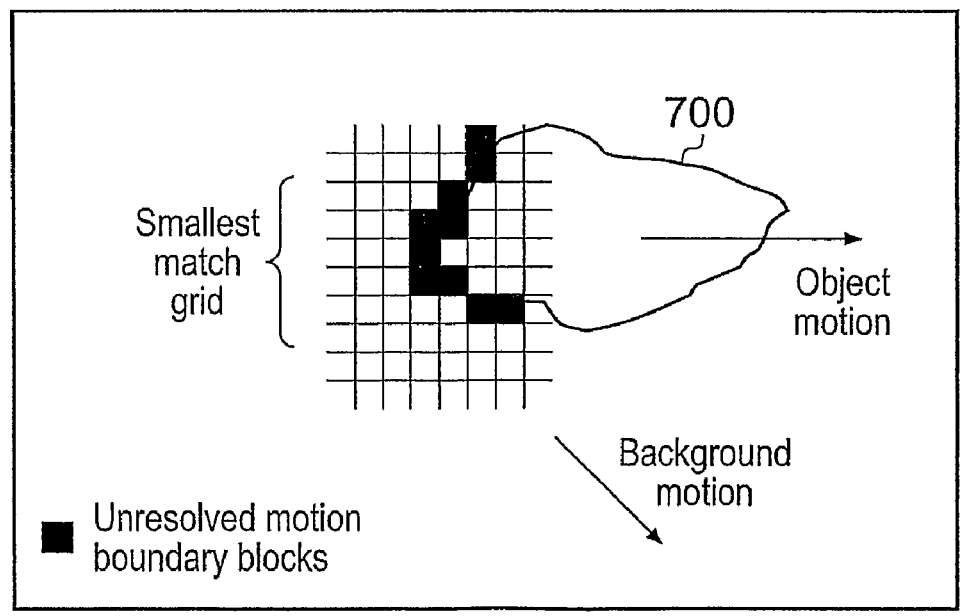

FIG. 18*b* schematically illustrates the smallest block match grid which can be used in the block match process described above. Even with this smallest grid, there remain blocks (shown as dark squares) at the boundary between the object 700 and its moving background for which a motion vector cannot be properly resolved.

Reference will now be made to four blocks at the boundary region between the object 700 and the background. These blocks are shown schematically in FIGS. 18c to 18e.

Figure 18C:
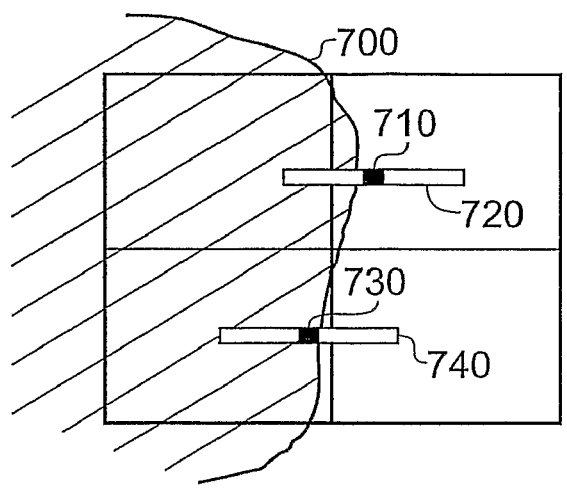

In FIG. 18c, an example is shown of a horizontal polyphase filter 720 applied to correct the phase of a pixel 710 just inside the background. Another example is shown of a horizontal polyphase filter 740 applied to correct the phase of a pixel 730 just inside the object.

The filter 720 will be "contaminated" with object pixels (which will have an incorrect phase with respect to the background), and the filter 740 will be contaminated by background pixels (which will have an incorrect phase with respect to the object). It would be better to avoid such contamination. The same concerns apply to vertical GST filters (not shown in FIG. 18c).

Figure 18D:
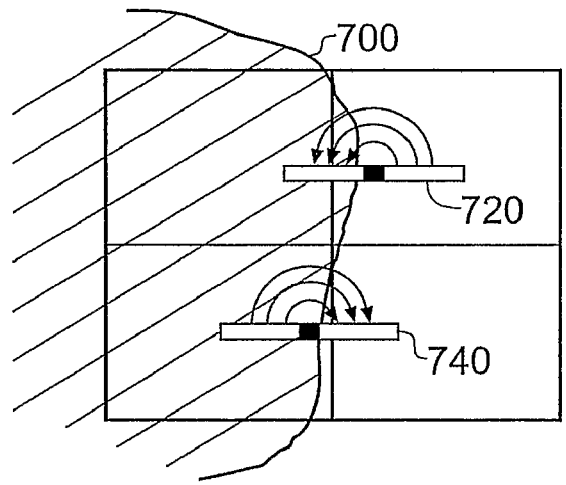

It would be possible to use a mirroring process to re-use pixels within the correct are (object or background) so as to avoid this contamination. FIG. 18d is a schematic example of such a process, in which taps in the polyphase filters 720, 740 which fall the "wrong side" of the boundary are actually applied to pixel values from the correct side of the boundary. Such a mirroring process would be required when the filter centre is within a half-filter width (i.e. a threshold) of the boundary, i.e. when any one of the filter taps overlaps the boundary. As illustrated, the mirroring process is symmetrical about the filter centre (the pixel 710 or 730) but the reflection could instead be symmetrical about the boundary. Alternatively, the pixel value at or immediately inside the boundary could be re-used as many times as are necessary. Similar considerations apply to vertical GST filters. The result of any of these processes is that at least one of the pixel values is used in respect of two (or more) filter taps (the filter taps referring to non-zero filter taps, i.e. those which will contribute to the filtered output value).

But unfortunately, such a mirroring process relies on a knowledge of where the boundary lies. The location of the boundary requires a successful motion vector verification stage. So, this is a circular problem; the location of the boundary is needed to locate the boundary correctly.

The present embodiment addresses this problem by the elegantly simple technique of using shorter positional correction (polyphase/GST) filters (i.e. fewer taps) for motion vector verification than for pixel output.

It is desired to retain longer filters for the final output image, because of the general increase in quality that this provides. Shorter filters can cause unwanted artefacts such as "ringing" in the output image.

But for motion vector verification, whereby a motion vector is assigned to each pixel, shorter filters give less risk of contamination and provide an increased chance of being able to assign motion vectors correctly near to a motion boundary.

Figure 18E:
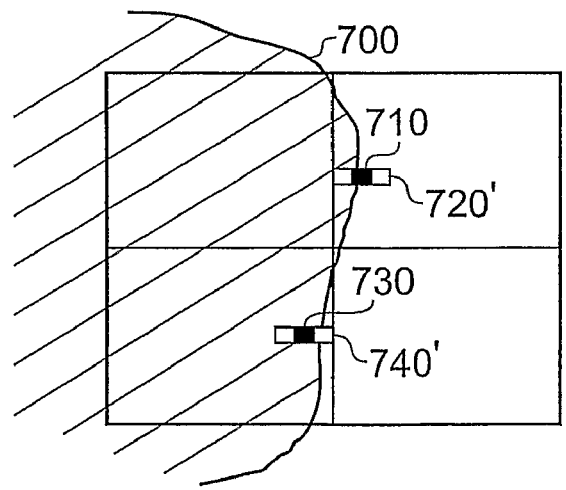

FIG. 18e schematically illustrates two short filters 720' and 740' applied to the motion vector verification stage. Longer filters such as those shown schematically in FIG. 18c, possibly with mirroring as described with reference to FIG. 18d, would be used for generation of the final output image (where the circular problem described above does not apply because the verification stage has already been dealt with). The same considerations can apply vertically as well as horizontally.

Typical filter tap lengths are as follows:

|  | Vertical | Horizontal |
| --- | --- | --- |
| Motion vector verification | 11 | 11 |
| Final output image | 41 | 31 |

It will be appreciated that the embodiments of the invention can be implemented in programmable or semi-programmable hardware operating under the control of appropriate software. This could be a general purpose computer or arrangements such as an ASIC (application specific integrated circuit) or an FPGA (field programmable gate array). The software could be supplied on a storage medium such as a disk or solid state memory, or via a transmission medium such as a network or internet connection, or via combinations of these.

The invention claimed is:

1. An image processing apparatus in which output pixels of an output image are generated from one or more input images using a set of motion vectors having a sub-pixel accuracy, the apparatus comprising:
a processor configured to:
allocate motion vectors in the set to pixels of the output image, the motion vector allocator being arranged to compare a current output pixel with test image areas pointed to by motion vectors in the set to detect a most suitable motion vector for the current output pixel; and
generate the output pixels, the processor operating in a first mode if the output pixel is within a threshold displacement from an image region having substantially different motion characteristics to those of that output pixel, and in a second mode otherwise, by applying a first spatial filter for generating an output pixel value at a required pixel position to a sub-pixel accuracy;
in which:
in the first mode, the first spatial filter is applied to a group of pixel values derived from the input image(s) such that the group does not extend into an image area having different motion characteristics to those of the output pixel by re-using pixel values from an image area having the same motion characteristics as those of the output pixel, so that at least one such pixel value is applied to more than one non-zero filter tap of the first spatial filter; and
in the second mode, the first spatial filter is applied to a group of pixel values derived from the input image(s), there being one such pixel value for each non-zero filter tap.

2. The image processing apparatus according to claim 1, in which:
the processor is configured to apply a second spatial filter for comparing the current output pixel and a test image area to a sub-pixel accuracy; and
the second spatial filter has fewer filter taps than the first spatial filter.

3. The image processing apparatus according to claim 1, in which an output image is derived from at least two input images.

4. The image processing apparatus according to claim 1, in which the input images are images of an input video signal and the output image is an image of an output video signal.

5. The image processing apparatus according to claim 1, the apparatus being a scan conversion apparatus.

6. An image processing method in which output pixels of an output image are generated from one or more input images using a set of motion vectors having a sub-pixel accuracy, the method comprising:

allocating motion vectors in the set to pixels of the output image by comparing a current output pixel with test image areas pointed to by motion vectors in the set to detect a most suitable motion vector for the current output pixel; and generating the output pixels in a first mode if the output pixel is within a threshold displacement from an image region having substantially different motion characteristics to those of that output pixel, and in a second mode otherwise, by applying a spatial filter to generate an output pixel value at a required pixel position to a sub-pixel accuracy;

in which:

in the first mode the spatial filter is applied to a group of pixel values derived from the input image(s) such that the group does not extend into an image area having substantially different motion characteristics, to those of the output pixel by re-using pixel values from an image area having the same motion characteristics as those of the output pixel, so that at least one such pixel value is applied to more than one non-zero filter tap of the spatial filter; and in the second mode the spatial filter is applied to a group of pixel values derived from the input image(s), there being one such pixel value for each non-zero filter tap.

7. A non-transitory computer-readable medium including computer software having program code which, when executed by a computer, is arranged to cause the computer to carry out a method according to claim 6.

* * * * *